United States Patent
Turner et al.

(10) Patent No.: US 8,950,558 B2
(45) Date of Patent: Feb. 10, 2015

(54) DAMPERS WITH THERMAL EXPANSION COMPENSATION

(71) Applicant: Fox Factory, Inc., Scotts Valley, CA (US)

(72) Inventors: Roy A. Turner, Victorville, CA (US); Barna B. Madau, Apple Valley, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 131 days.

(21) Appl. No.: 13/709,981

(22) Filed: Dec. 10, 2012

(65) Prior Publication Data

US 2013/0168194 A1    Jul. 4, 2013

Related U.S. Application Data

(60) Provisional application No. 61/581,372, filed on Dec. 29, 2011.

(51) Int. Cl.
*F16F 9/52*    (2006.01)
*F16F 9/06*    (2006.01)

(52) U.S. Cl.
CPC ................. *F16F 9/526* (2013.01); *F16F 9/067* (2013.01)
USPC ............................ 188/267; 188/276; 188/314

(58) Field of Classification Search
CPC ............. F16F 9/52; F16F 9/526; F16F 9/064; F16F 9/065
USPC ........................... 188/276–278, 269, 314, 297
See application file for complete search history.

(56) References Cited

U.S. PATENT DOCUMENTS

| | | | |
|---|---|---|---|
| 1,164,371 A | 12/1915 | Lovejoy | |
| 3,865,356 A | 2/1975 | Wossner | |
| 4,153,237 A * | 5/1979 | Supalla ...................... | 267/64.15 |
| 4,271,938 A | 6/1981 | Berger | |
| 4,407,396 A | 10/1983 | Sirven | |
| 4,515,253 A | 5/1985 | Itoh | |
| 4,546,959 A | 10/1985 | Tanno | |
| 4,616,810 A | 10/1986 | Richardson et al. | |
| 4,645,043 A | 2/1987 | Imaizumi | |
| 4,645,044 A | 2/1987 | Kato et al. | |
| 4,749,068 A | 6/1988 | Sirven | |
| 4,858,898 A | 8/1989 | Niikura et al. | |
| 4,972,928 A | 11/1990 | Sirven | |
| 5,064,032 A | 11/1991 | Ashiba | |
| 5,190,126 A | 3/1993 | Curnutt | |
| 5,207,300 A | 5/1993 | Engel et al. | |
| 5,226,512 A | 7/1993 | Kanari | |
| 5,400,880 A | 3/1995 | Ryan | |

(Continued)

*Primary Examiner* — Anna Momper
(74) *Attorney, Agent, or Firm* — Workman Nydegger

(57) ABSTRACT

A damper includes a housing bounding a primary chamber and a compensation chamber, the primary chamber including a first gas compartment and a control compartment that are separated by an expansion piston, the compensation chamber including a second gas compartment and an overflow compartment that are separated by a compensation piston. A piston rod has a first end slidably disposed within the control compartment. A first fluid path is in fluid communication with the overflow compartment so that when the expansion piston is in the first position, the expansion piston blocks fluid communication between the control compartment and the overflow compartment by way of the first fluid path and when the expansion piston is in the second position, the hydraulic fluid can freely flow from the control compartment to the overflow compartment by way of the first fluid path.

16 Claims, 7 Drawing Sheets

(56) References Cited

U.S. PATENT DOCUMENTS

| | | |
|---|---|---|
| 5,505,281 A | 4/1996 | Lee |
| 5,533,586 A | 7/1996 | Thompson |
| 5,533,596 A | 7/1996 | Patzenhauer et al. |
| 5,593,007 A * | 1/1997 | Siltanen ................ 188/269 |
| 5,664,649 A | 9/1997 | Thompson et al. |
| 5,927,449 A | 7/1999 | Huang et al. |
| 5,957,252 A | 9/1999 | Berthold |
| 6,086,060 A | 7/2000 | Berthold |
| 6,220,409 B1 | 4/2001 | Deferme |
| 6,254,067 B1 | 7/2001 | Yih |
| 6,264,015 B1 | 7/2001 | DeKock |
| 6,286,642 B1 | 9/2001 | Yi |
| 6,305,512 B1 | 10/2001 | Heinz et al. |
| 6,340,153 B1 | 1/2002 | Miesner |
| 6,390,457 B1 | 5/2002 | Roper |
| 6,450,304 B1 | 9/2002 | Miller et al. |
| 6,880,684 B1 | 4/2005 | Evans et al. |
| 7,124,865 B2 | 10/2006 | Turner et al. |
| 8,118,144 B2 | 2/2012 | Turner |
| 8,807,542 B2 * | 8/2014 | Galasso et al. ............. 267/64.15 |
| 2002/0121416 A1 * | 9/2002 | Katayama et al. ............ 188/314 |
| 2004/0020730 A1 | 2/2004 | Turner |
| 2004/0145099 A1 | 7/2004 | Kojima |

* cited by examiner

DAMPERS WITH THERMAL EXPANSION COMPENSATION

CROSS-REFERENCE TO RELATED APPLICATIONS

This application claims the benefit of U.S. Provisional Application No. 61/581,372 filed Dec. 29, 2011, which is incorporated herein by specific reference.

BACKGROUND OF THE INVENTION

1. The Field of the Invention

The present invention relates to hydraulic dampers and, more specifically, hydraulic dampers wherein the pressure within the hydraulic dampers is automatically regulated as the temperature within the dampers varies.

2. The Relevant Technology

Dampers are used in conventional shock absorbers, front forks, and other suspension systems to dampen or absorb an impact or force applied to the suspension system. For example, a conventional damper includes a tubular housing bounding a sealed chamber. The chamber is divided by a floating piston into a primary chamber and a secondary chamber. An incompressible hydraulic fluid is disposed within the primary chamber while a compressible gas is disposed within the secondary chamber. One end of a piston rod having a piston mounted thereon is also disposed within the primary chamber. Orifices extend through the piston so that the piston can slide within the primary chamber of the housing as the hydraulic fluid passes through the orifices.

When a compressive force is applied to the damper, such as when an automobile having shock absorbers hits a bump, the force seeks to drive the piston rod into the primary chamber of the housing. The damper partially absorbs this force by using the force to compress the hydraulic fluid through orifices. When a rebound force is applied to the damper, such as through the application of a spring, the damper again regulates the rebound force by requiring the hydraulic fluid to pass back through the orifices in the piston in order for the piston rod to return to its original position.

Although conventional dampers impart some degree of damping to suspension systems, conventional dampers have significant shortcomings. For example, during extended use, the hydraulic fluid is heated due to the hydraulic fluid being repeatedly forced through the orifices in the piston. As the hydraulic fluid is heated, the hydraulic fluid expands in the primary chamber of the damper so as to move the floating piston and compress the gas within the secondary chamber. In turn, compressing the gas increasing the gas pressure that is applied through the floating piston on the hydraulic fluid and the piston rod. Furthermore, heat from the hydraulic fluid is transferred through the housing and floating piston so as to heat the gas within the secondary chamber. Heating of the gas further increases the gas pressure and thus the force applied against the hydraulic fluid and the piston rod.

As a result of the increased force applied against the piston rod within the primary chamber, a greater external force must be applied to the piston rod to advance the piston rod into the chamber of the damper. Accordingly, for dampers used in an automobile, motorcycle or other forms of vehicle suspension systems, the ride of the vehicle becomes increasingly stiff as the temperature of the hydraulic fluid and gas within the damper increases.

To provide optimal damping in a suspension system, it is generally desirable that the piston rod force and damping properties of a damper be independent and unaffected by change in temperature of the hydraulic fluid and compressible gas contained within the damper. As such, what is needed in the art are dampers that adjust the pressure on the hydraulic fluid within the dampers as the hydraulic fluid expands and contracts with changes in temperature.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
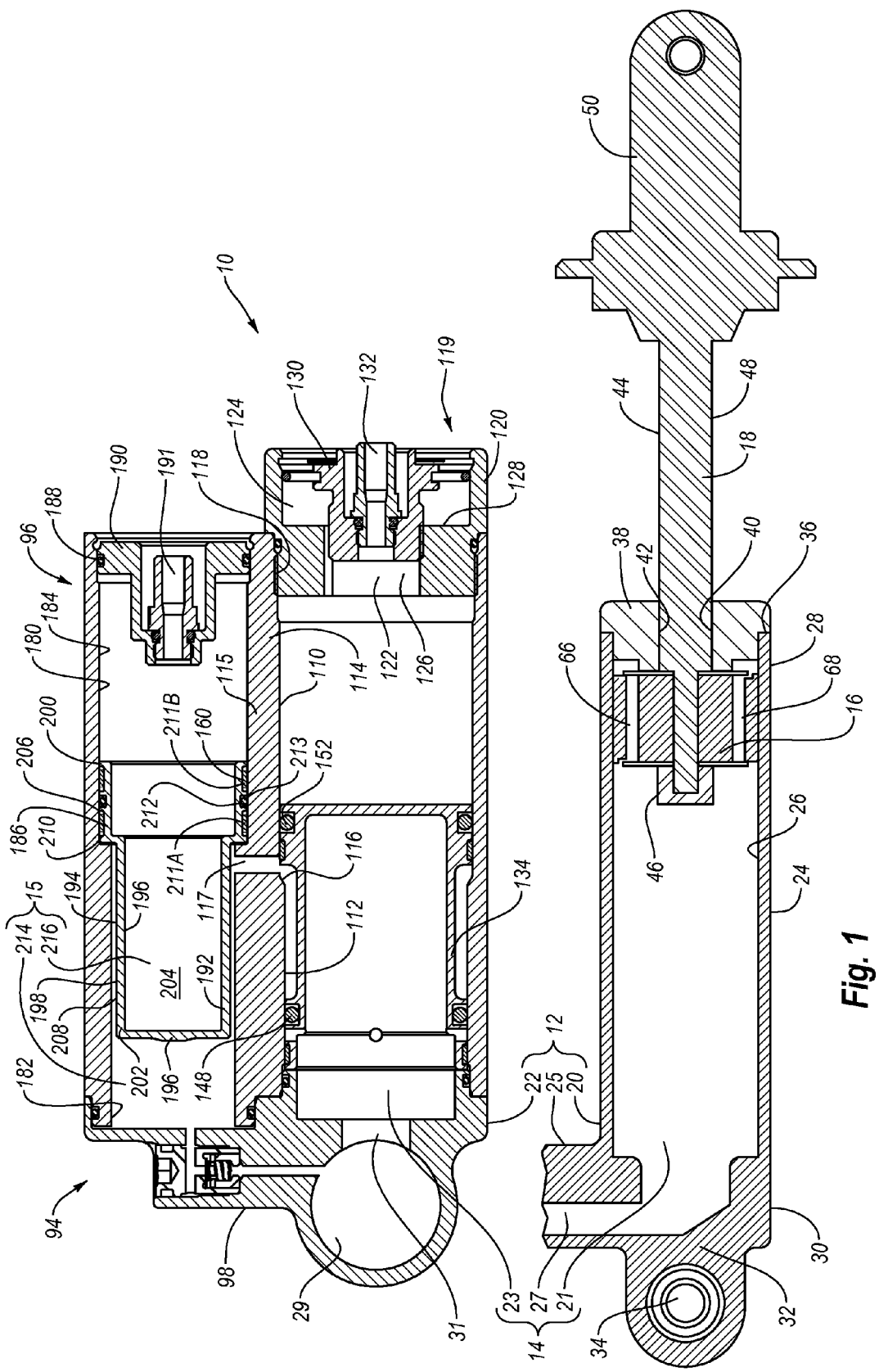
FIG. 1 is a cross sectional side view of one embodiment of a damper in a cold state with a piston rod in a retracted position.

Depicted in FIG. 1 is one embodiment of a damper 10 incorporating features of the present invention. Damper 10 and other dampers disclosed herein can be used in association with all types of vehicles or mechanical apparatus where it is desired to dampen suspension movement and/or vibration. The dampers can be used independently or as part of a shock absorber, front fork, or other suspension system. Examples of vehicles on which the dampers can be used include bicycles, motorcycles, automobiles, all terrain vehicles, snowmobiles, airplanes, and the like.

In general damper 10 comprises a housing 12 bounding a primary chamber 14 and a compensation chamber 15. A damping piston 16 is movably disposed within primary chamber 14. Damping piston 16 is mounted on a piston rod 18 such that movement of piston rod 18 moves damping piston 16 within primary chamber 14.

Figure 2:
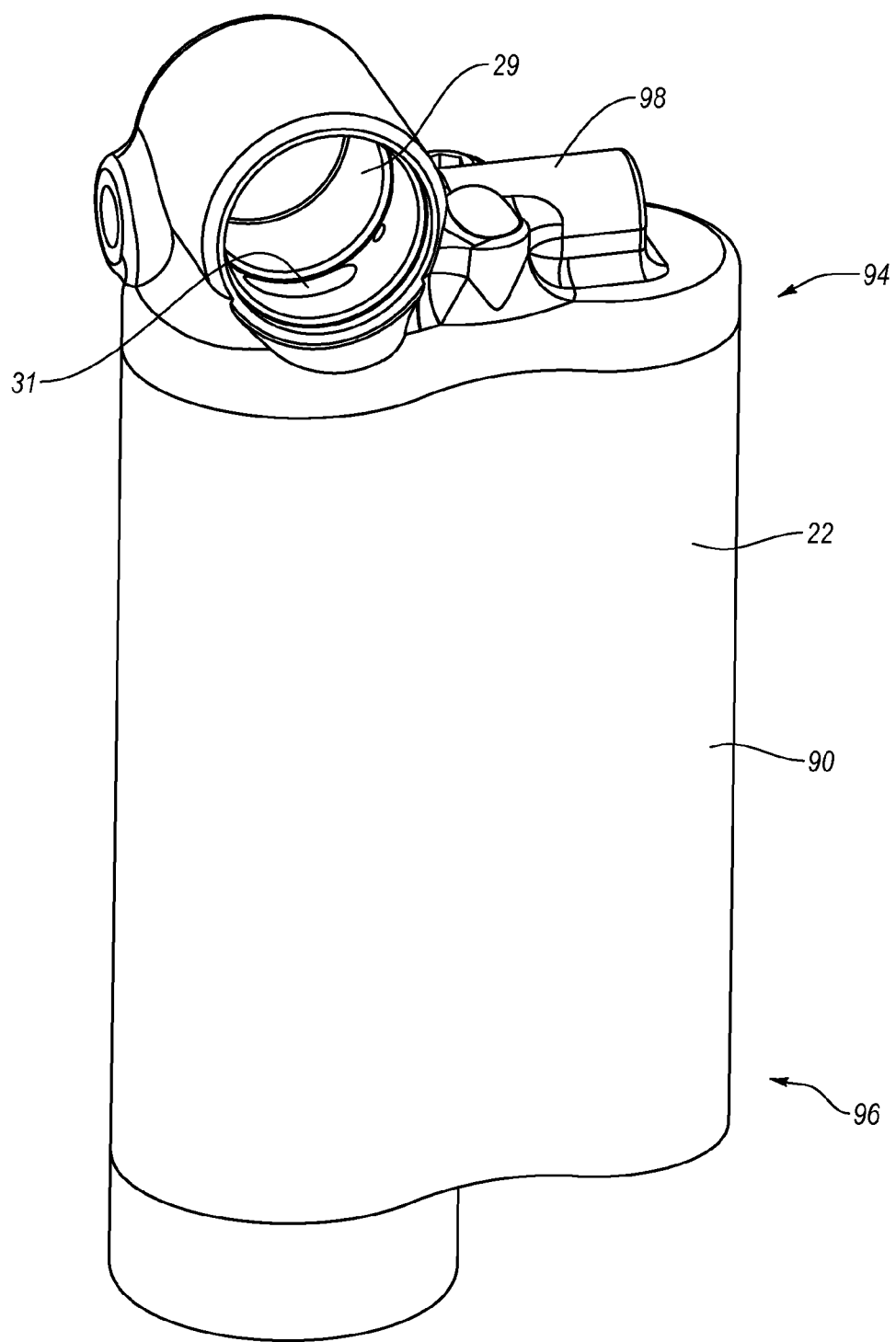
FIG. 2 is a perspective view of the secondary housing of the damper shown in FIG. 1.

As will be discussed below in greater detail, housing 12 can have a variety of different configurations and sizes. In the embodiment depicted in FIG. 1, housing 12 comprises a primary housing 20 which bounds a damping chamber 21, a secondary housing 22 which bounds an expansion chamber 23 and compensation chamber 15, and a transition housing 25 which at least partially bounds a transfer channel 27. As depicted in FIG. 2, secondary housing 22 comprises an opening 29 that communicates with an inlet 31 to expansion chamber 23. Returning to FIG. 1, in one embodiment housing 12 has a piggy-back configuration wherein transition housing 25 is configured to rigidly secure and seal to opening 29 so that primary housing 20 and secondary housing 22 are in substantially parallel alignment. In an alternative embodiment, secondary housing 22 can operate as a separate remote structure.

In this embodiment, transition housing 25 can comprise a flexible or rigid line that extends from primary housing 20 to opening 29 on secondary housing 22. In either embodiment, transition housing 25 extends between primary housing 20 and secondary housing 22 such that transition channel 27 provides fluid communication between damping chamber 21 and expansion chamber 23. Damping chamber 21, expansion chamber 23, and transition channel 27 combine to form primary chamber 14.

Primary housing 20 comprises an elongated tubular sidewall 24 having an interior surface 26 extending between a first end 28 and an opposing second end 30. Disposed at second end 30 is an end wall 32 having a mounting hole 34 formed thereat. In alternative embodiments, mounting hole 34 can be replaced with a clevis mount, studded mount, or other conventional mounts. First end 28 of sidewall 24 terminates at an opening 36. A cap 38 is mounted on first end 28 of sidewall 24 so as to cover opening 36. Cap 38 has an interior surface 40 which bounds a passageway 42 extending through cap 38 so as to communicate with damping chamber 21.

Figure 3:
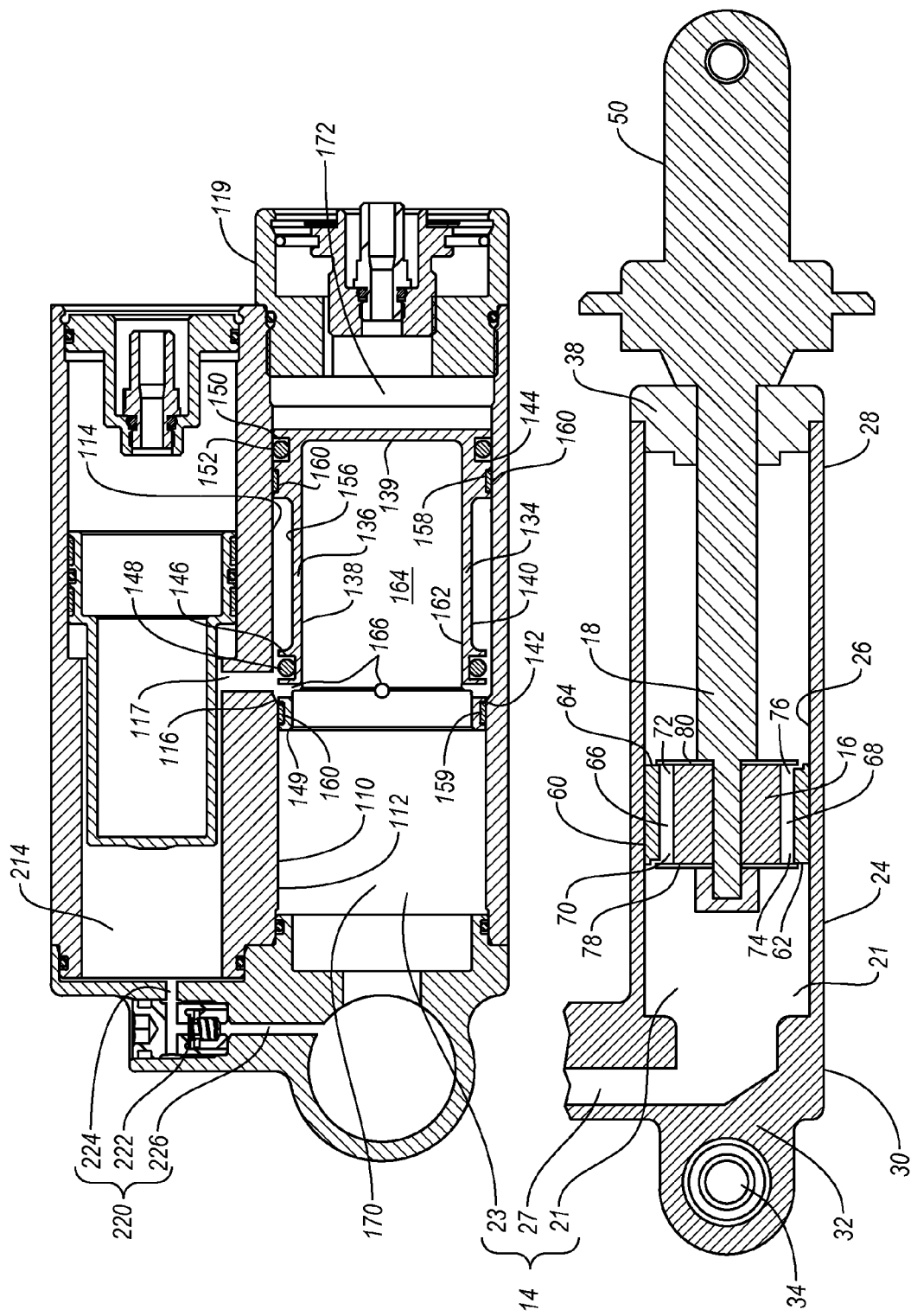
FIGS. 3 and 4 are cross sectional side views of the damper shown in FIG. 1 in a heated state with the piston rod in a compressed position.

Piston rod 18 is slidably disposed within passageway 42. Specifically, piston rod 18 has an exterior surface 44 that extends between a first end 46 and an opposing second end 48. A mounting bracket 50 is secured on second end 48 of piston rod 18. First end 46 of piston rod 18 is disposed within damping chamber 21. Damping piston 16 is mounted on first end 46 of piston rod 18 so as to move concurrently with piston rod 18. For example, piston rod 18 slides within passageway 42 so that both piston rod 18 and damping piston 16 can selectively move relative to housing 12 at any location between a retracted position as shown in FIG. 1 and a compressed position as shown in FIG. 3. It is appreciated that any number of seals, gasket, O-rings, packing and the like can be mounted on cap 38 so as to provide a continued sealed engagement between cap 38 and piston rod 18 as piston rod 18 repeatedly moves between the retracted position and the compressed position.

As will be discussed below in greater detail, disposed within damping chamber 21 is a hydraulic fluid. As used in the specification and appended claims, the term "hydraulic fluid" is intended to include all types of fluids that can be used to transfer hydraulic pressures. Examples of hydraulic fluids include petroleum based hydraulic fluids, petroleum/synthetic blend hydraulic fluids, and full synthetic hydraulic fluids. Although hydraulic fluids are generally considered as being non-compressible, it is appreciated that hydraulic fluids can be emulsified or have entrained gas, thereby making them slightly compressible.

As depicted in FIG. 3, damping piston 16 has an annular side surface 60 that extends between a first end face 62 and an opposing second end face 64. In one embodiment side surface 60 is movably sealed against sidewall 24 by being biased thereagainst. In other embodiments, one or more O-rings, gaskets, or other seals is disposed between side surface 60 of damping piston 16 and interior surface 26 of sidewall 24 so that damping piston 16 is continuously sealed against interior surface 26 as damping piston 16 repeatedly moves between the retracted position and the compressed position.

Extending through damping piston 16 between first end face 62 and second end face 64 is at least one pressure port 66 and at least one rebound port 68. Pressure port 66 has a first opening 70 formed on first end face 62 of damping piston 16 and a second opening 72 formed on second end face 64 of damping piston 16. Similarly, rebound port 68 has a first opening 74 on first end face 62 of damping piston 16 and a second opening 76 on second end face 64 of damping piston 16. A flexible metal spring shim 78 encircles piston rod 18 so as to bias against first end face 62 of damping piston 16 while a flexible metal shim 80 encircles piston rod 18 so as to bias against second end face 64 of damping piston 16.

When damping piston 16 is stationary, shim 78 extends over first opening 74 of rebound port 68 while allowing open fluid communication between primary chamber 14 and first opening 70 of pressure port 66. In contrast, when damping piston 16 is stationary shim 80 extends over second opening 72 of pressure port 66 while allowing fluid communication between primary chamber 14 and second opening 76 of rebound port 68. During operation, shims 78 and 80 each function as a one-way check valve. Specifically, to enable damping piston 16 to move from the retracted position in FIG. 1 to the compressed position in FIG. 3, the hydraulic fluid within damping chamber 21 has to pass through damping piston 16. Because rebound port 68 is closed by shim 78 at first end face 62, the hydraulic fluid can only pass through pressure port 66 as damping piston 16 moves toward the compressed position.

Prior to movement of damping piston 16, shim 80 must be flexed so that the hydraulic fluid can pass through second opening 72 of pressure port 66. When a compression force is applied to piston rod 18 in the direction of moving damping piston 16 into the compressed position, a corresponding force is applied by the hydraulic fluid within the pressure port 66 against shim 80. If the force applied by the hydraulic fluid is sufficient to backwardly flex shim 80, the hydraulic fluid is free to pass through pressure port 66 enabling damping piston 16 to move within primary chamber 21 toward the compressed position. Damping piston 16 continues to move until the compression force applied to piston rod 18 decreases to the extent that the hydraulic fluid within pressure port 66 can no longer flex shim 80.

Similarly, when a retraction force is applied to piston rod 18 in the direction of moving damping piston 16 from the compressed position to the retracted position, the hydraulic fluid is forced to travel through rebound port 68. Again, if the corresponding force applied by the hydraulic fluid within rebound port 68 to shim 78 is sufficient to backwardly flex shim 78, the hydraulic fluid is free to pass through rebound port 68 enabling damping piston 16 to move within damping chamber 21 toward the retracted position. In alternative embodiments, it is appreciated shims 78 and 80 can be replaced with a plurality of stacked shims which require a greater force before flexing. Furthermore, shims 78 and 80 can be replaced with other one-way check valve configurations such as a solid washer or hinged flap that is spring biased against damping piston 16. Other check valve configurations can also be used.

Forcing the hydraulic fluid to flex shims 78 and 80 and pass through the constricted passages of pressure port 66 and rebound port 68 during movement of piston rod 18 results in damping of the applied compression force and retraction force. In alternative embodiments, it is appreciated that damping piston 16 and/or piston rod 18 can have a variety of alternative configurations. For example, shims 78 and 80 can be replaced with spring valves or other types of valves that open and close as the hydraulic fluid presses there against. Other embodiments of damping piston 16 enable automatic and/or adjustable control of the damping properties. By way of example and not by limitation, some alternatives are disclosed in U.S. Pat. No. 7,308,976 which is incorporated herein by specific reference.

Returning to FIG. 2, secondary housing 22 comprises an encircling sidewall 90 extending between a first end 94 and an opposing second end 96. First end 94 terminates at an end wall 98 on which opening 29 is formed.

Turning to FIG. 1, expansion chamber 23 within secondary housing 22 has an annular interior surface 110 that extends between opposing ends 94 and 96. Annular interior surface 110 includes a first portion 112 disposed at first end 94, a second portion 114 disposed at second end 94 (second portion 114 having a larger diameter than first portion 112), and a shoulder 116 that radially outwardly expends from first portion 112 to second portion 114. A partition wall 115 is disposed between expansion chamber 23 and compensation chamber 15 on which a portion of interior surface 110 is formed. A first fluid path 117 extends through partition wall 115 between expansion chamber 23 and compensation chamber 15. First fluid path 117 is formed on second portion 114 of interior surface 110 adjacent to shoulder 116.

Interior surface 110 bounds an opening 118 at second end 96. A cap assembly 119 is disposed within opening 118. Specifically, cap assembly 119 comprises a cap 120 that is threaded or otherwise secured within opening 118. A passage 122 extends through cap 120 and includes an enlarged first passage 124, a constricted second passage 126 and an annular shoulder 128 extending therebetween. Cap assembly 119 also includes an insert 130 that is threaded into passage 122. By rotating insert 130, insert 130 can be threaded farther into passage 126, thereby decreasing the volume of passage 126 bounded within secondary housing 22, or can be backed out of passage 126, thereby increasing the volume of passage 126 bounded within secondary housing 22. O-rings or other seals can be formed between cap 120 and interior surface 110 and between insert 130 and cap 120 so that gas tight seals are formed therebetween. Secured to and extending through insert 130 is a gas valve 132. Gas valve 132 can be used to inject gas into or remove gas from expansion chamber 23.

Turning to FIG. 3, moveably disposed within expansion chamber 23 is an expansion piston 134 which is in the form of a floating piston. Specifically, expansion piston 134 comprises a body 136 that includes an annular sidewall 138 that terminates at an end wall 139. Sidewall 138 has an exterior surface 140 that extends from a first end 142 to an opposing second end 144. Exterior surface 140 has an annular groove 146 formed at first end 142 into which an annular seal 148, such as an O-ring, is received. Groove 146 and annular seal 148 are configured so that annular seal 148 forms a sealed engagement between sidewall 138 and first portion 112 of interior surface 110 when annular seal 148 overlies first portion 112, as shown in FIG. 1, but annular seal 148 is spaced apart from second portion 114 and does not form a sealed engagement between sidewall 138 and second portion 114 of interior surface 110 when annular seal 148 overlies shoulder 116 or second portion 114, as shown in FIG. 3. Similarly, an annular groove 150 is formed at second end 144 of expansion piston 134 into which an annular seal 152 is received. Groove 150 and annular seal 152 are configured so that annular seal 152 forms a sealed engagement between sidewall 138 and second portion 114 of interior surface 110 as expansion piston 134 is moved within expansion chamber 23.

An annular recess 156 is formed on exterior surface 140 of expansion piston 134 between annular seals 148 and 152. A further annular groove 158 is formed on exterior surface 140 between annular seal 152 and annular recess 156. Likewise, an annular groove 159 is formed on exterior surface 140 between annular seal 148 and an end face 149 of expansion piston 134. A bearing 160 is disposed within each of grooves 158 and 159 to assist expansion piston 134 in sliding within expansion chamber 23. Bearings 160 are in the form of an annular ring of a low friction material such as TEFLON. Expansion piston 134 has an interior surface 162 that bounds a pocket 164 that is open at first end 142. A plurality of radially spaced apart ports 166 extend through expansion piston 134 from interior surface 162 to exterior surface 140 and are located between grooves 146 and 159.

Expansion piston 134 is designed to slide back and forth within expansion chamber 23. As a result of the sealed engagements formed by annular seals 148 and 152, expansion piston 134 moves longitudinally within expansion chamber 23 when a pressure is applied to either side thereof while at least substantially preventing the transfer of liquids or gases between the opposing sides of expansion piston 134.

As discussed above, primary chamber 14 comprises all of damping chamber 21, expansion chamber 23 and transfer channel 27. Expansion piston 134, however, divides primary chamber 14 into a control compartment 170 and a first gas compartment 172. Specifically, the sealed portion of primary chamber 14 disposed between expansion piston 134 and cap assembly 119 corresponds to first gas compartment 172 while the sealed portion of primary chamber 14 disposed between expansion piston 134 and cap 38 corresponds to control compartment 170. Thus, control compartment 170 includes damping chamber 21, transfer channel 27 and the first end of expansion chamber 23. The volume of control compartment 170 and first gas compartment 172 can vary inversely as expansion piston 134 moves. For example, assuming all other variable are held constant, the volume of control compartment 170 increases and the volume of first gas compartment 172 decreases as expansion piston 134 moves toward cap assembly 119.

Disposed within control compartment 170 is a hydraulic fluid. Disposed within first gas compartment 172 is a compressible gas. By way of example and not by limitation, the compressible gas can comprise air, oxygen, nitrogen, helium or any other compressible gas or combination of gases. In one embodiment the gas is dehumidified. The compressible gas within first pressure compartment 120 can be set at any desired pressure. For example, in one embodiment when damping piston 16 is in the retracted position, the compressible gas in first gas compartment 172 is typically at a pressure greater than about 50 psi ($35 \text{ N/m}^2$), more commonly greater than about 100 psi ($70 \text{ N/m}^2$), and more commonly greater than about 150 psi ($105 \text{ N/m}^2$). Other pressures can also be used. As will be discussed below in greater detail, the pressure within first gas compartment 172 changes as damping piston 16 moves between the retracted position and the extended position.

In one embodiment of the present invention, means are provided for putting a gas into or withdrawing a gas from first gas compartment 172. By way of example and not by limitation, gas valve 132, as discussed above, communicates with first gas compartment 172 and can provide gas thereto or withdraw gas therefrom. In one embodiment, gas valve 121 comprises a SCHRADER charge valve. Any other conventional gas valves can also be used.

As noted above, expansion piston 134 can slidably move between a first position, as shown in FIG. 1, and a second position, as shown in FIG. 3. In the first position, annular seals 148 and 152 seal against portions 112 and 114 of interior surface 110, respectively. In the second position, expansion piston 134 has moved sufficient far down expansion chamber 23 so that annular seal 148 has passed over shoulder 116 and is inwardly spaced apart from second portion 114 of interior surface 110. In this second position, annular seal 148 no longer forms a seal with interior surface 110 although annular seal 152 still retains a liquid and gas tight seal therewith. In this second position, hydraulic fluid from within control compartment 170 can pass either around bearing 160 and/or through ports 166, through first fluid path 117, and into compensation chamber 15. As expansion piston 134 moves back toward the first position, annular seal 148 again seals against first portion 112 and thereby precludes further hydraulic fluid within control compartment 170 from flowing through first fluid path 117.

Returning to FIG. 1, compensation chamber 15 is bounded by an annular side surface 180 that longitudinally extends between first end 94 and opposing second end 96 of secondary housing 22. As with interior surface 110, side surface 180 includes a first portion 182 disposed at first end 94, a second portion 184 disposed at second end 96 (second portion 184 having a larger diameter than first portion 182), and a shoulder 186 that radially outwardly expands from first portion 182 to second portion 184. First fluid path 117 is formed on first portion 182 of side surface 180 at a location spaced apart from shoulder 186. Compensation chamber 15 is bounded at first end 94 by end wall 98. Side surface 180 bounds an opening 188 at second end 96. A cap 190 is secured within opening 188 and an o-ring or other type seal can be used to form a gas tight seal therebetween. A gas valve 191 is mounted on cap 190. Gas valve 191 permits gas to be delivered into or removed from compensation chamber 15 in the same manner as gas valve 132.

Slidably disposed within compensation chamber 15 is a compensation piston 192. Compensation piston 192 includes an annular sidewall 194 that terminates at an end wall 196. Sidewall 194 has an interior surface 196 and an exterior surface 198 that extend between a first end 200 and an opposing second end 202. Interior surface 196 bounds a pocket 204 that is open at first end 200. Exterior surface 198 comprises an annular first section 206 located at first end 200, an annular second section 208 located at second end (second section 208 having a smaller diameter than first section 206) and a shoulder 210 that radially inwardly extends from first section 206 to second section 208. A pair of spaced apart annular grooves 211 A and B are formed on first section 206 into which bearings 160 are received as previously discussed. An annular groove 212 is formed between grooves 210A and B into which an annular seal 213, such as an o-ring, is disposed.

Compensation piston 192 is positioned within compensation chamber 15 so that first section 206 and shoulder 210 overlay first portion 184 of side surface 180. Annular seal 213 is sized to form a gas/liquid tight seal between first section 206 and first portion 184 of side surface 180. Shoulder 210 has an outer diameter that is larger than the diameter of second portion 182 of side surface 180. As such, shoulders 186 and 210 hit against each other as compensation piston 192 slides toward first end 94 of secondary housing 22, thereby limiting how far compensation piston 192 can slide toward second end 94.

Second section 208 of sidewall 194 can freely slide into the area of compensation chamber 15 bounded by first portion 182 of side surface 180. However, second section 208 is slightly spaced apart from first portion 182 so that hydraulic fluid can freely flow through first fluid path 117 and into compensation chamber 15 even when compensation piston 192 overlies first fluid path 117. Furthermore, shoulders 186 and 210 prevent annular seal 213 from passing over the opening of first fluid path 117.

As a result of the sealed engagement produced by annular seal 213, compensation piston 192 effectively divides compensation chamber 15 into an overflow compartment 214 and a second gas compartment 216. Specifically, the sealed portion of compensation chamber 15 disposed between compensation piston 192 and cap 196 corresponds to second gas compartment 216 while the sealed portion of compensation chamber 15 disposed between compensation piston 192 and end wall 98 corresponds to overflow compartment 214. The volume of overflow compartment 214 and second gas compartment 216 vary inversely as compensation piston 192 moves within compensation chamber 15.

Disposed within overflow compartment 214 is a hydraulic fluid. Disposed within second gas compartment 216 is a compressible gas. It is appreciated that the hydraulic fluid that flows through first fluid path 117 flows into overflow compartment 214.

Second housing 22 also includes a second fluid path 220 that extends from overflow compartment 214 back to control compartment 170. Specifically, second fluid path 220 includes a pressure valve 222 disposed within end wall 98 of secondary housing 22, an inlet path 224 that extends from overflow compartment 214 to pressure valve 222 and an outlet path 226 that extends from pressure valve 222 to control compartment 170. Pressure valve 222 is subject to pressure on one side from the hydraulic fluid within overflow compartment 214 and on the other side by the hydraulic fluid within control compartment 170. Pressure valve 222 can comprise any type of pressure actuated valve that opens to allow fluid to flow through second flow path 220 when the fluid pressure in overflow compartment 214 is greater than the fluid pressure within control compartment 170 and closes to prevent the flow of fluid through second flow path 220 when the fluid pressure in overflow compartment 214 is less than the fluid pressure within control compartment 170.

Figure 4:
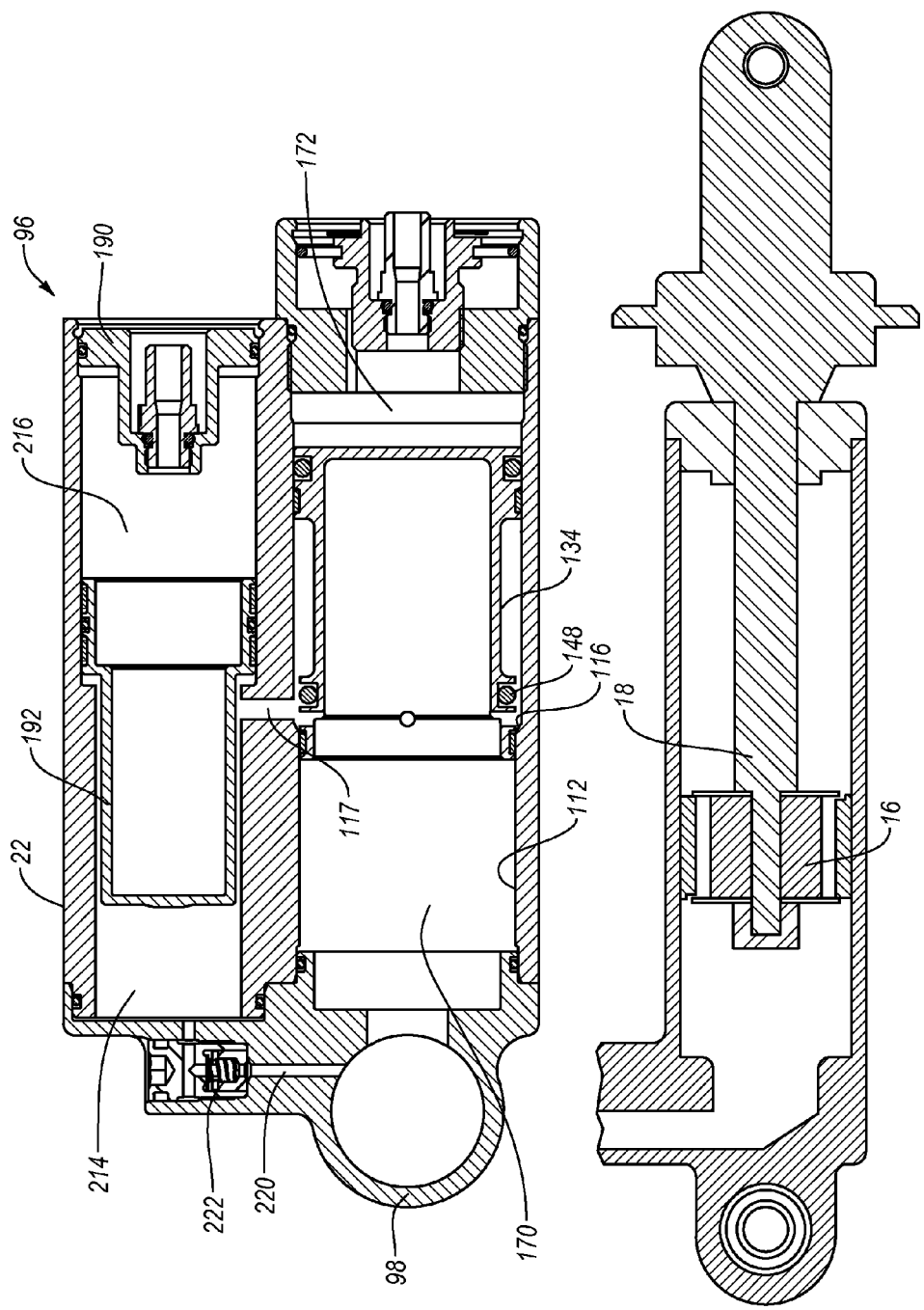

Based on the above discussion and with reference to FIG. 4, damper 10 comprises control compartment 170 and overflow compartment 214 that are both filled within hydraulic fluid. Damper 10 also comprises first gas compartment 172 and second gas compartment 216 that are both filled with a compressible gas. Damping piston 16 and damping rod 18 slide back and forth within control compartment 170. Expansion piston 134 is movably positioned between control compartment 170 and first gas compartment 172. Based on its position, expansion piston 134 controls the opening and closing of first fluid path 117 that extends from control compartment 170 and overflow compartment 214. Compensation piston 192 is movably positioned between overflow compartment 214 and second gas compartment 216. Second fluid path 220 extends between overflow compartment 214 and control compartment 170 and is controlled by a pressure valve 222.

In the cold, initial setup of damper 10, as shown in FIG. 1, expansion piston 134 can butt against end wall 98 when piston rod 18 is in the retracted position. Compensation piston 192 can either butt against shoulder 210 or can be shifted toward second end 96 as shown in FIG. 3. By having compensation piston 192 initially shifted toward second end 96, damper 10 can compensate for moving damper 10 to a colder environment which results in the contraction of the hydraulic fluid. The gas pressure in gas compartment 172 is typically greater than the gas pressure within gas compartment 216. In some situations, however, the gas pressure within gas compartments 172 and 216 can be the same. For example, the pressures can be the same when damper 10 is in a cold state, i.e., the hydraulic fluid has not been heated by the movement of damping piston 16 or other moving parts, and piston rod 18 is in the retracted position.

During operation, as piston rod 18 moves from the retracted position as shown in FIG. 1 to the compressed position shown in FIG. 4, more and more of piston rod 18 enters control compartment 170. That is, the combined volume of first gas compartment 172 and control compartment 170 is decreased because a portion of the combined volume is now occupied by a larger section of piston rod 18. As piston rod 18 enters control compartment 170 and displaces the hydraulic fluid, the hydraulic fluid pushes expansion piston 134 toward second end 96 of secondary housing 22, thereby compressing the gas within first gas compartment 172. Where the temperature of the hydraulic fluid is relatively cold, expansion piston 134 only slides to a position where annular seal 148 remains sealed against first portion 112, i.e., annular seal 148 does not pass over shoulder 116 and thus hydraulic fluid cannot flow through first fluid path 117. As piston rod 18 moves back to the retracted position of FIG. 1, the combined volume of first gas compartment 172 and control compartment 170 increases, thereby allowing expansion piston 134 to move back to its original position and the gas in first gas compartment 172 to return to its original pressure.

Repeated movement of damping piston 16 and piston rod 18 between the retracted and compressed positions causes the hydraulic fluid within control compartment 170 to be heated. In turn, heating of the hydraulic fluid causes the hydraulic fluid to expand within control compartment 170. Heat from the hydraulic fluid is also transferred through expansion piston 134 and secondary housing 22 so as to heat the gas within first gas compartment 172. As discussed in the background section, in conventional damper designs, this heating of the hydraulic fluid and gas would increase the pressure within control compartment 170. This increase in pressure would make it more difficult to advance piston rod 18 into control compartment 170, particularly as damping piston 18 approaches the compressed position. Furthermore, the increased pressure would act as a rebound force which would drive piston rod 18 out of control compartment 170 with increased force. As a result, damping properties would be change based on the temperature of the hydraulic fluid. One embodiment of the present invention, however, helps to decreases or eliminate this problem of variable damping based on the temperature of the hydraulic fluid.

Specifically, once the hydraulic fluid within control compartment 170 has expanded under heat to a predetermined volume, advancing damping piston 18 to the compressed position, such as the fully compressed position, causes annular seal 148 to temporarily pass over shoulder 116, as shown in FIG. 3, which in turn permits a portion of the hydraulic fluid within control compartment 170 to pass through ports 166, along first fluid path 117 and into overflow compartment 214. In turn, fluid entering overflow compartment 214 causes compensation piston 192 to slide toward cap 190 so as to increase the volume of overflow compartment 214. Once a portion of the hydraulic fluid exits control compartment 170 through first fluid path 117, the fluid pressure decreases within control compartment 170 so that expansion piston 134 shifts back toward end wall 98, thereby closing off first fluid path 117.

By allowing a portion of the expanded hydraulic fluid to repeatedly escape from control compartment 170 as the temperature of the hydraulic fluid increases, the pressure acting on damping piston 16 and damping rod 18 stabilizes over a large range of elevated temperatures. As such, the damping properties of damper 10 have greater stability over a large range of elevated temperatures for the hydraulic fluid.

As the hydraulic fluid cools within control compartment 170, the hydraulic fluid contracts causing expansion piston 134 to shift toward end wall 98 which in turn causes annular seal 148 to maintain first fluid path 117 closed. In turn, once the fluid pressure within control compartment 170 decreases below the pressure within overflow compartment 214, pressure valve 222 opens allowing a portion of the hydraulic fluid to pass from overflow compartment 214, through second fluid path 220 and back into control compartment 170. As hydraulic fluid exits overflow compartment 214, compensation piston 192 slides back toward end wall 98. Having hydraulic fluid flow back into control compartment 170 as the hydraulic fluid cools and contracts ensures that damping properties are maintained at low temperatures.

In view of the foregoing, damper 10 is able to maintain relatively consistent damping properties as the temperature of the hydraulic fluid within damper 10 increases and decreases. Another benefit of this embodiment of the invention is that the regulating of the damping properties is achieved automatically without the use of electricity, software, a computer processor, or other electronically controlled mechanisms. In other embodiments, however, the valves and other components can be electronically controlled.

It is appreciated that damper 10 can be adjusted in a number of different ways to change the damping. For example, increasing the pressure in first gas compartment 172 increases the stiffness of damper 10. Likewise, screwing insert 130 into cap 120 so as to decrease the volume of first gas compartment 172 increases the rate of stiffness of damper 10 as piston rod 18 advances into control compartment 170.

Figure 5:
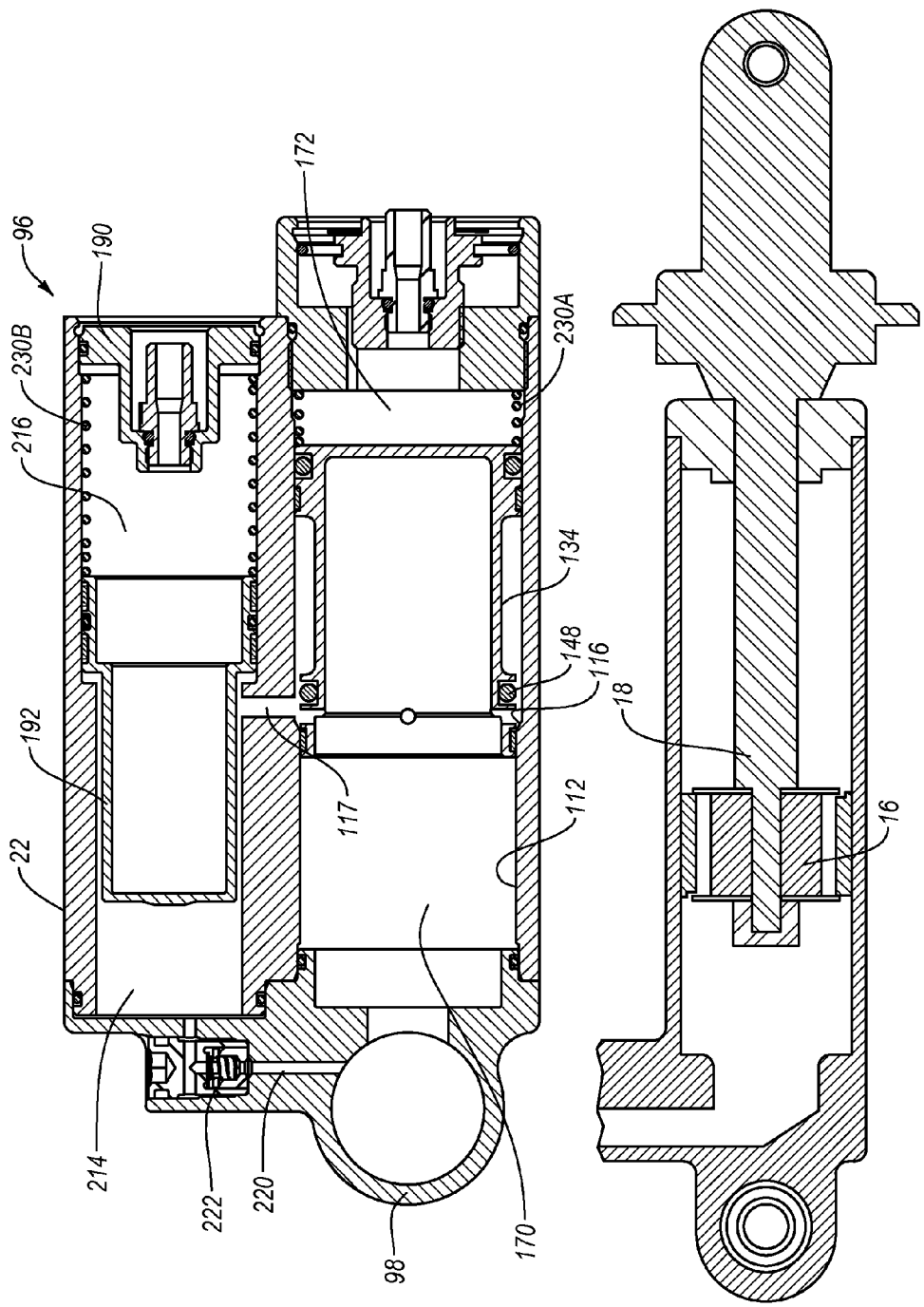
FIG. 5 is a cross sectional side view of an alternative embodiment of the damper shown in FIG. 4 with a spring positioned within each of the gas compartments.

The present invention envisions that damper 10 and the parts thereof can come in a variety of different designs and configurations. For example, in one embodiment as depicted in FIG. 5, a spring 230A can be positioned within first gas compartment 172 while a spring 230B can be positioned within second gas compartment 216. Springs 230A and B provide resilient resistance to pistons 134 and 192, respectively, and can act in conjunction with pressurized gas within compartments 172 and 216 or can replace the use of pressurized gas within compartments 172 and 216. Where pressurized gas is not used, compartments 172 and 216 need not be sealed. Although springs 230A and B are depicted as being coiled springs, the springs can have any desired configuration that will provide a resilient force against the pistons. It is appreciated that compressed gas and springs have different compression and rebounding properties and thus there selection of use can depend on the intended use of the damper.

Figure 6:
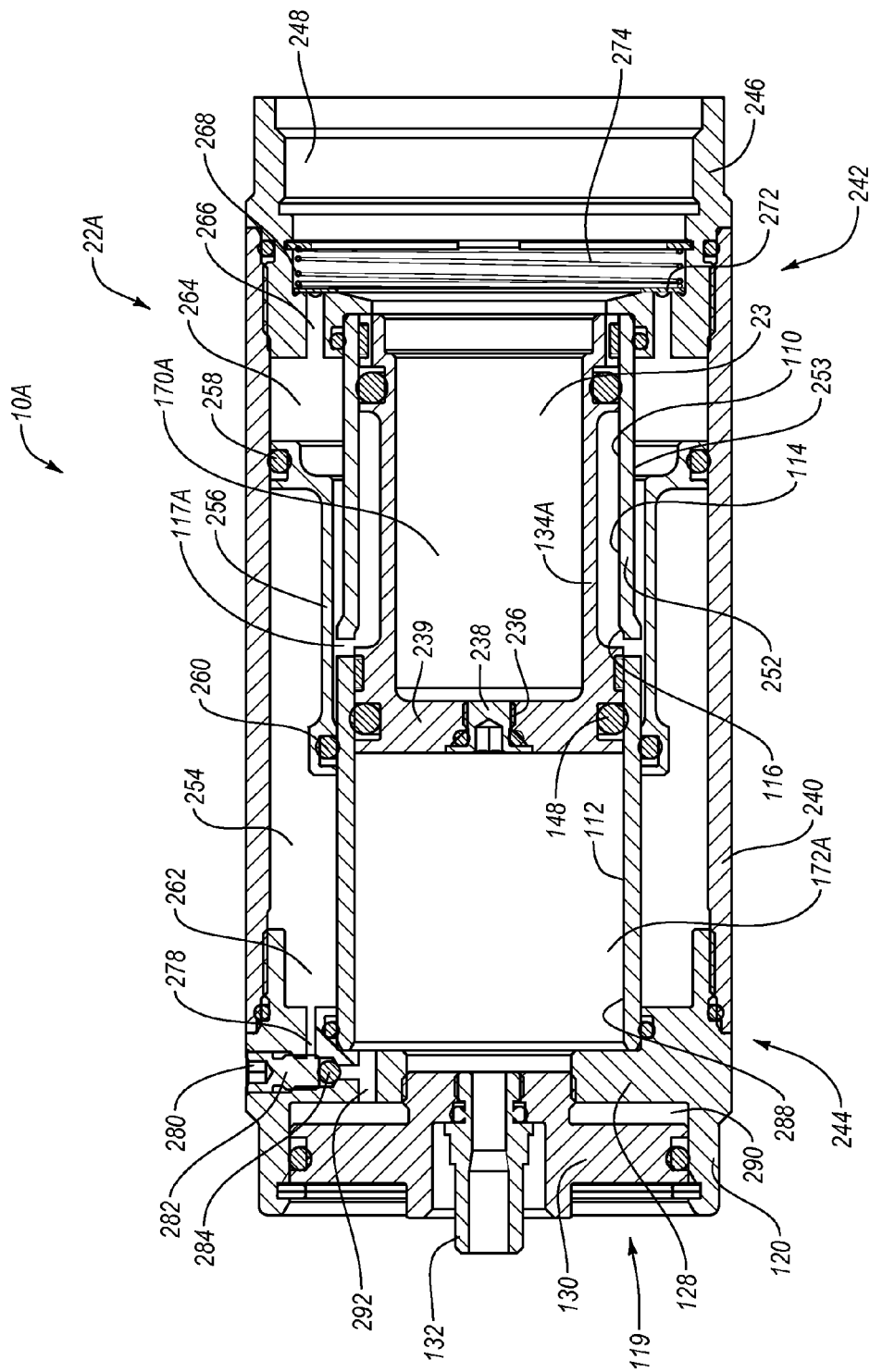
FIG. 6 is a cross sectional side view of an alternative embodiment of a secondary housing that can be used with the damper shown in FIG. 1, the damper being in a cold state with the related piston rod retracted.

Depicted in FIG. 6 is an alternative embodiment of a secondary housing 22A that can be coupled with primary housing 20 through transition housing 25 (FIG. 1) to form an alternative damper 10A. Like elements between secondary housing 22A and secondary housing 22 are identified by like reference characters. In contrast to secondary housing 20 where compensation chamber 15 and expansion chamber 23 are adjacently disposed in parallel alignment, in secondary housing 22A the expansion chamber is centrally disposed within the compensation chamber. More specifically, secondary housing 22A comprises and encircling side wall 240 that extends between a first end 242 and an opposing second end 244. Secured within first end 242 is a tubular stem 246 that bounds an opening 248 extending therethrough. Opening 248 corresponds to opening 29 in FIG. 2 and is used for fluid coupling with transition housing 25 (FIG. 1). Cap assembly 119 is secured at second end 244 of side wall 240 and includes cap 120, insert 130, and gas valve 132 as previously discussed with regard to FIG. 1.

Centrally disposed within secondary housing 22A is a tubular sleeve 252 that also extends between opposing ends 242 and 244. First end 242 of sleeve 252 is secured against stem 246 while second end 244 of sleeve 252 is secured against cap 120. Sleeve 252 has an exterior surface 254 and also includes interior surface 110 which partially bounds expansion chamber 23 therein. As previously discussed with regard to FIG. 1, interior surface 110 includes first portion 112, second portion 114, and shoulder 116 therebetween.

Slidably disposed within expansion chamber 23 is an expansion piston 134A having substantially the same configuration as expansion piston 134. However, expansion piston 134A has a passage 236 extending through end wall 139 thereof. An insert 238 is threaded into passage 136 so as to seal passage 236 closed. Passage 236 is used in the assembly process for damper 10A.

A first gas compartment 172A is formed between expansion piston 134A and cap assembly 119. The remainder of expansion chamber 23, which is disposed on the opposing side of expansion piston 134A, comprises a portion of a control compartment 170A. Formed between tubular sleeve 252 and side wall 240 is a compensation chamber 254. Slidably disposed within compensation chamber 254 is a composition piston 256. Composition piston 256 is annular and includes a first annular seal 258 that seals against the interior surface of side wall 240 and a second annular seal 260 that seals against exterior surface 253 of sleeve 252. Compensation piston 256 separates compensation chamber 254 into a second gas compartment 262 and an overflow compartment 264. A first fluid path 117A extends through sleeve 252 so as to provide fluid communication between control compartment 170A and overflow compartment 264. Expansion piston 134A moves within sleeve 252 to selectively open and close first fluid path 117A in the same manner that is discussed above with regard to expansion piston 134.

A second fluid path 266 provides fluid communication for hydraulic fluid flowing from overflow compartment 264 back into control compartment 170A. A pressure valve 268 controls the flow of hydraulic fluid through second fluid path 266. More specifically, second fluid path 266 extends from overflow compartment 264 to opening 248 of stem 246. Pressure valve 268 includes an annular shim 272 covering a second end 273 of second fluid path 266. A spring 274 pushes shim 272 against opening 248 so as to prevent fluid from passing therethrough. However, once the fluid pressure within overflow compartment 264 is greater than the fluid pressure within control compartment 170A, hydraulic fluid within overflow compartment 264 will push shim 272 back allowing fluid to flow from overflow compartment 264 to control compartment 170A. It is appreciated that second fluid path 266 can comprise two or more spaced apart channels that extend through stem 246 and are each selectively closed by shim 272. It is again appreciated that pressure valve 268 can come in a variety of different configurations.

The present invention also includes a gas flow path 278 that extends through cap 120A from first gas compartment 172A to second gas compartment 262. A control valve 280 permits selective opening and closing of gas flow path 278. Gas flow path 278 makes it simple to initially charge first gas compartment 172A and second gas compartment 262 to the same pressure. For example, with control valve 280 open, gas valve 132 can be used to inject gas into first gas compartment 172A which gas flows through gas flow path 278 to second gas compartment 262. As such, the gas pressure within compartments 172A and 262 are the same. Once the desired pressure is reached, control valve 280 is closed so that the gas pressures within compartments 172A and 262 are now independently controlled by the movement of pistons 134A and 256 along with other variables.

In the depicted embodiment, control valve 280 simply comprises a bolt 282 that is treaded into cap 128 and that pushes a ball 284 against a mouth formed along gas flow path 278. In alternative embodiments, however, it is appreciated that control valve 280 can have a variety of alternative configurations. Furthermore, control valve 280 is not required in that separate gas valves can be used to independently deliver gas into gas compartments 172A and 262. In still other embodiments where pressurized gas is not used but rather a mechanical spring is used to control the rebound of the pistons, neither the gas valves nor the control valve are required.

Figure 7:
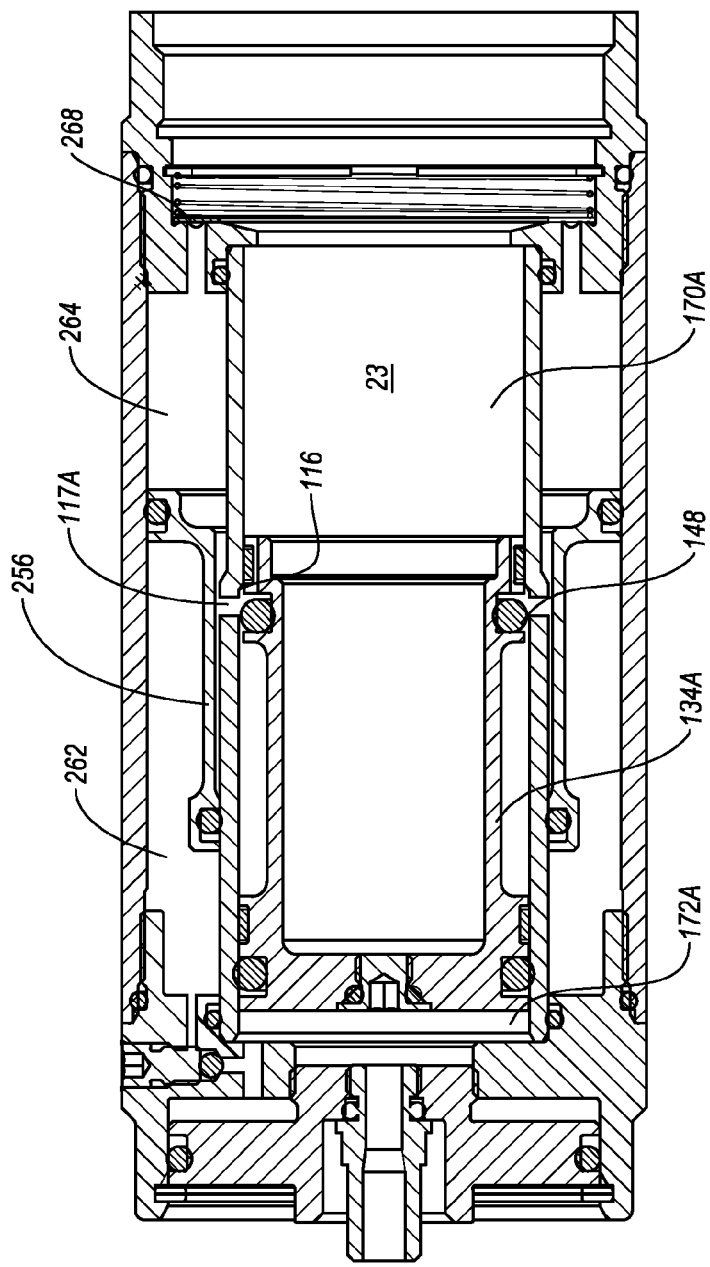
FIG. 7 cross sectional side view of an alternative embodiment of a secondary housing for use with the damper shown in FIG. 1, the damper being in a heated state with the related piston rod in a fully compressed state.

First gas compartment 172A is shown as comprising a first portion 288 disposed on one side of shoulder 128 of cap 120 and a second portion 290 disposed on the opposing side of cap 120. Insert 130 engaging with cap 120 seals off communication between portions 288 and 290. However, to provide gas communication therebetween, a gas line 292 can be formed through shoulder 128 between portions 288 and 290. Gas line 292 can be a part of or separate from gas flow path 278. Using gas line 292 increases the size of first gas compartment 172A by adding in portion 290. Furthermore, because second portion 290 has a larger diameter than first portion 288, the total volume of first gas compartment 172A can be more quickly adjusted by screwing insert 130 into and out of second portion 290. It is appreciated that damper 10A works in substantially the same fashion as damper 10. Specifically, when damper 10A is cold and piston rod 18 begins to slide in and out of damping chamber 21 (FIGS. 1 and 3), expansion piston 134A correspondingly slides back and forth within expansion chamber 23 but not to an extent as to open first fluid path 117A. However, as depicted in FIG. 7, as the temperature of the hydraulic fluid increases, causing the hydraulic fluid to expand, expansion piston 134A will eventually reach the point where as piston rod 18 is moved to the compressed position (FIG. 3), such as the fully compressed position, annular seal 148 of expansion piston 134A will pass onto or over shoulder 116 and temporarily permit a portion of the hydraulic fluid within control compartment 170A to pass through first fluid path 117 and into overflow compartment 264. In turn, the flow of hydraulic fluid causes movement of compensation piston 256 which compresses the gas (or spring, as applicable) within second gas compartment 172A. This process continues as the temperature of the hydraulic fluids continues to increase. As use of damper 10A decreases, the temperature of the hydraulic fluid decreases and the volume of the hydraulic fluid contracts. Eventually, the pressure of the hydraulic fluid within overflow compartment 264 is greater than the pressure of the hydraulic fluid within control compartment 170A which causes the hydraulic fluid to open pressure valve 268 and flow from overflow compartment 264 back into control compartment 170A.

The present invention may be embodied in other specific forms without departing from its spirit or essential characteristics. For example, in one embodiment, primary housing 20 and secondary housing 22A can be formed as one continuous elongated housing, thereby eliminating the need for transition housing 25. In still other embodiments, the compensation chamber could be formed in a housing that is separate from the housing bounding the expansion chamber. In each embodiment, it is also appreciated that the pistons, valves, housings and other components can have a variety of different configuration and that different components can be mixed and matched between different embodiments. As such, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A damper comprising:
   a housing bounding a primary chamber and a compensation chamber, the primary chamber comprising a first gas compartment and a control compartment each having a volume, the compensation chamber comprising a second gas compartment and an overflow compartment;

an expansion piston movably disposed within the primary chamber so as to separate the first gas compartment from the control compartment, the volume of the first gas compartment and the control compartment each being adjustable based on movement of the expansion piston, the expansion piston being movable between a first position and a second position;

a compensation piston movably disposed within the compensation chamber so as to separate the second gas compartment from the overflow compartment, the volume of the second gas compartment and the overflow compartment each being adjustable based on movement of the compensation piston;

a gas disposed within the first and second gas compartments;

hydraulic fluid disposed within the control compartment and the overflow compartment;

a piston rod having a first end slidably disposed within the control compartment, the piston rod being movable between a compressed position wherein a portion of the piston rod is advanced into the control compartment and a retracted position wherein the portion of the piston rod is retracted out of the control compartment;

a first fluid path in fluid communication with the overflow compartment so that when the expansion piston is in the first position, the expansion piston blocks fluid communication between the control compartment and the overflow compartment by way of the first fluid path and when the expansion piston is in the second position, the hydraulic fluid can freely flow from the control compartment to the overflow compartment by way of the first fluid path;

a second fluid path extending from the overflow compartment to the control compartment; and a pressure valve operable between an open position wherein the hydraulic fluid can flow from the overflow compartment to the control compartment by way of the second fluid path and a closed position wherein the pressure valve precludes the hydraulic fluid from flowing from the overflow compartment to the control compartment by way of the second fluid path.

2. The damper as recited in claim 1, wherein the housing comprises:

a primary housing bounding a portion of the primary chamber; and a secondary housing bounding the compensation chamber and a portion of the primary chamber.

3. The damper as recited in claim 2, further comprising a transition housing extending between the primary housing and the secondary housing, the transition housing bounding a portion of the primary chamber.

4. The damper as recited in claim 3, wherein the transition housing comprises a flexible line.

5. The damper as recited in claim 1, further comprising a damping piston mounted on the first end of the piston rod, the damping piston being disposed within control compartment and having a passage extending therethrough.

6. The damper as recited in claim 1, wherein the compensation chamber encircles at least a portion of the primary chamber.

7. The damper as recited in claim 1, wherein the compensation piston encircles at least a portion of the expansion piston.

8. The damper as recited in claim 1, wherein the primary chamber has an interior surface that includes:

an annular first portion having a first diameter;

an annular second portion having a second diameter, the second diameter being larger than the first diameter; and an annular shoulder outwardly flaring from the first portion to the second portion.

9. The damper as recited in claim 8, wherein an opening of the first fluid path is formed on the second portion or the annular shoulder.

10. The damper as recited in claim 1, further comprising a spring disposed within the first gas compartment or the second gas compartment.

11. The damper as recited in claim 1, further comprising a gas valve in communication with the first gas compartment or the second gas compartment, the gas valve being configured to deliver gas therethrough.

12. The damper as recited in claim 1, further comprising:

a gas line extending from the first gas compartment to the second gas compartment; and a valve for selectively opening and closing the gas line.

13. The damper as recited in claim 1, further comprising:

wherein when the hydraulic fluid in the control compartment is in a first temperature range, the expansion piston continues to block the flow of hydraulic fluid through the first fluid path as the piston rod moves from the retracted position to the compressed position; and wherein when the hydraulic fluid in the control compartment is in a second temperature range that is higher than the first temperature range, the expansion piston temporarily opens the first fluid path so as to allow hydraulic fluid to flow therethrough as the piston rod moves from the retracted position to the compressed position.

14. The damper as recited in claim 1, wherein the pressure valve is open when the pressure of the hydraulic fluid in the overflow compartment is greater than the pressure of the hydraulic fluid within the control compartment.

15. A damper comprising:

a housing bounding a primary chamber and a compensation chamber, the primary chamber comprising a first gas compartment and a control compartment each having a volume, the compensation chamber comprising a second gas compartment and an overflow compartment;

an expansion piston movably disposed within the primary chamber so as to separate the first gas compartment from the control compartment, the volume of the first gas compartment and the control compartment each being adjustable based on movement of the expansion piston, the expansion piston being movable between a first position and a second position;

a compensation piston movably disposed within the compensation chamber so as to separate the second gas compartment from the overflow compartment, the volume of the second gas compartment and the overflow compartment each being adjustable based on movement of the compensation piston;

hydraulic fluid disposed within the control compartment and the overflow compartment;

a piston rod having a first end slidably disposed within the control compartment, the piston rod being movable between a compressed position wherein a portion of the piston rod is advanced into the control compartment and a retracted position wherein the portion of the piston rod is retracted out of the control compartment; and a first fluid path in fluid communication with the overflow compartment so that when the expansion piston is in the first position, the expansion piston blocks fluid communication between the control compartment and the overflow compartment by way of the first fluid path and when the expansion piston is in the second position, the hydraulic fluid can freely flow from the control compartment to the overflow compartment by way of the first fluid path.

16. The damper as recited in claim 15, further comprising:
a second fluid path extending from the overflow compartment to the control compartment; and
a valve operable between an open position wherein the hydraulic fluid can flow from the overflow compartment to the control compartment by way of the second fluid path and a closed position wherein the valve precludes the hydraulic fluid from flowing from the overflow compartment to the control compartment by way of the second fluid path.

* * * * *

UNITED STATES PATENT AND TRADEMARK OFFICE
CERTIFICATE OF CORRECTION

| | | |
|---|---|---|
| PATENT NO. | : 8,950,558 B2 | Page 1 of 1 |
| APPLICATION NO. | : 13/709981 | |
| DATED | : February 10, 2015 | |
| INVENTOR(S) | : Turner et al. | |

It is certified that error appears in the above-identified patent and that said Letters Patent is hereby corrected as shown below:

In the Specification

Column 6
Line 25, change "variable" to --variables--
Line 51, change "valve 121" to --valve 132--

Column 7
Line 38, change "grooves 210A and B" to --grooves 211A and B--

Column 11
Line 4, change "139" to --239--

Signed and Sealed this
Nineteenth Day of January, 2016

Michelle K. Lee
*Director of the United States Patent and Trademark Office*